April 27, 1965 F. F. CRANDELL 3,180,209
ULTRASENSITIVE COLOR AND EXPOSURE PHOTOMETER
Filed May 1, 1961 2 Sheets-Sheet 1
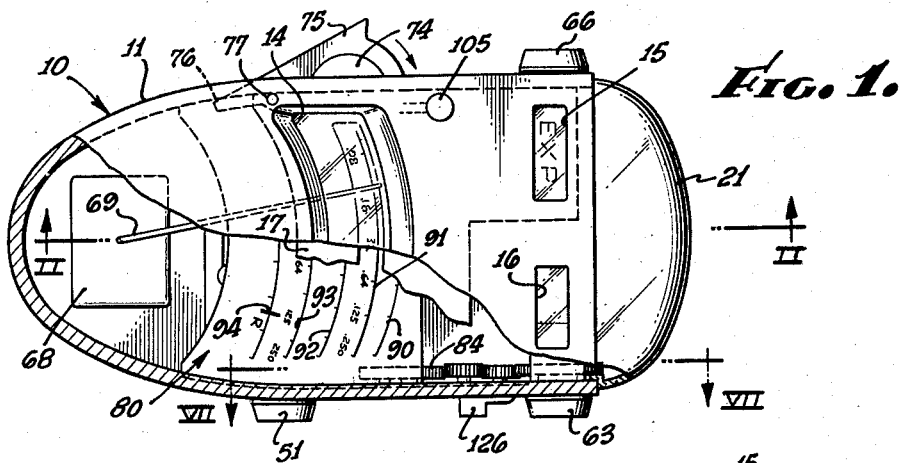
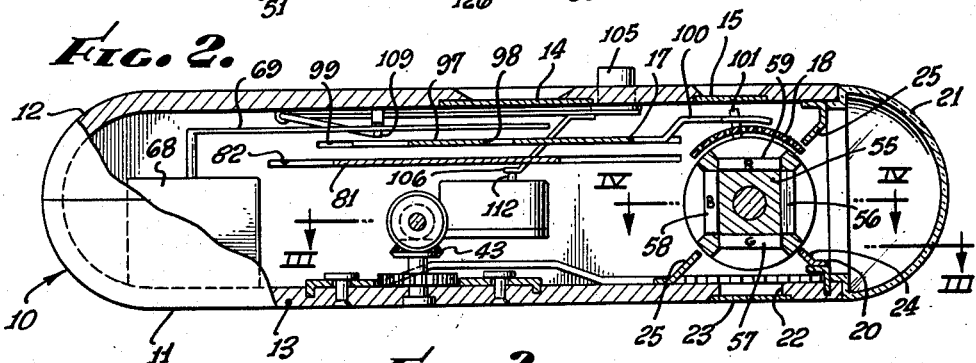
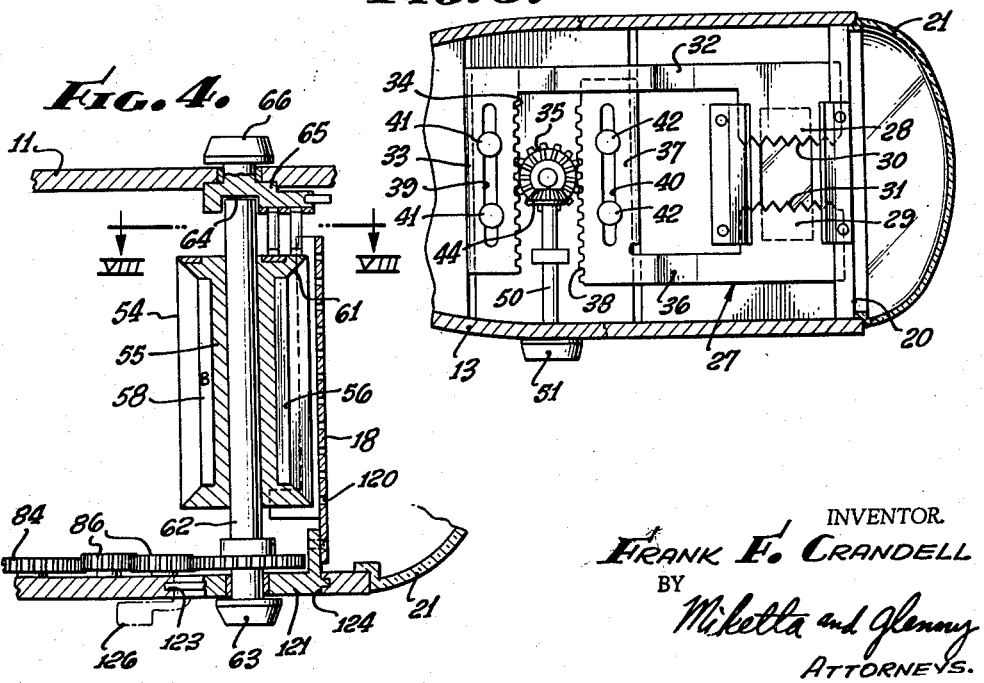
INVENTOR.
FRANK F. CRANDELL
BY Miketta and Glenny
ATTORNEYS.

April 27, 1965     F. F. CRANDELL     3,180,209
ULTRASENSITIVE COLOR AND EXPOSURE PHOTOMETER
Filed May 1, 1961     2 Sheets-Sheet 2
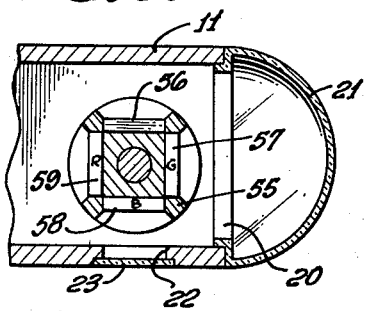
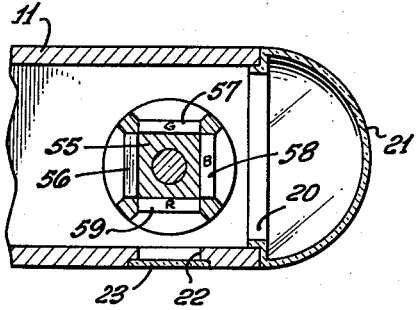
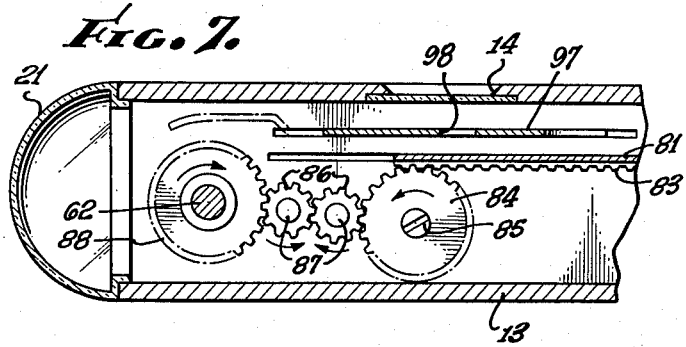
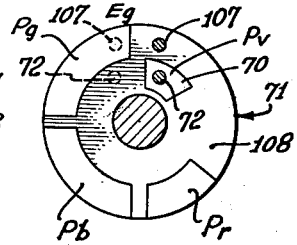
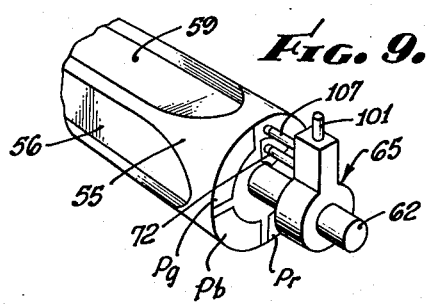
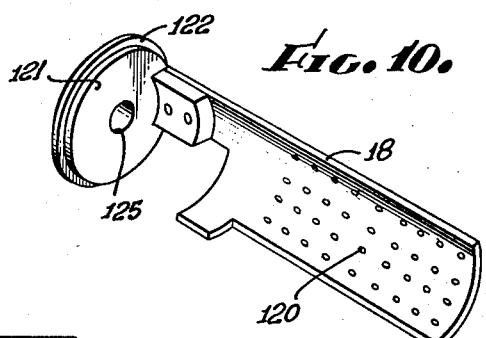
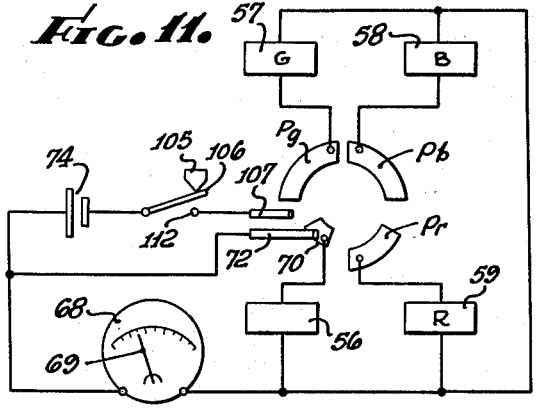
INVENTOR.
FRANK F. CRANDELL
BY
Miketta and Glenny
ATTORNEYS.

United States Patent Office 3,180,209
Patented Apr. 27, 1965

3,180,209
ULTRASENSITIVE COLOR AND EXPOSURE
PHOTOMETER
Frank F. Crandell, Pasadena, Calif., assignor to Photo Research Corporation, Hollywood, Calif., a corporation of California
Filed May 1, 1961, Ser. No. 106,695
15 Claims. (Cl. 88—23)

This invention relates to a compact portable combination and exposure meter for use in the photographic arts and in illumination engineering. More particularly the invention contemplates an ultrasensitive combination color and exposure meter of novel construction which includes improvements on the photometer described and claimed in my co-pending application, Serial No. 579,569 issued as United States Letters Patent 2,982,174, May 2, 1961. The present application is a continuation-in-part of said application Serial No. 579,569.

The present invention contemplates a photometer construction which provides a simple, effective device for obtaining exposure readings of intensity of illumination of light at relatively, extremely low light levels such as one-hundredth of a foot candle. The device of the present invention is also capable of reading relatively high light levels of illumination. The present invention also contemplates a three-color photometer in which selected wave bands of light are measured in a relatively direct manner and wherein said measurements may be conveniently utilized to determine color temperature in degrees Kelvin of the light being examined. In general the present invention contemplates a device wherein a plurality of light-responsive cells of photovoltaic and photoconductive type are employed, one type of cell being used to determine ordinary light levels of illumination and the other type of cells being used to determine very low light levels of illumination and color temperature.

It will be understood that present day processes of making photographic film have resulted in the production of very fast photographic film which is much more sensitive to light than has been heretofore available. For example, some presently available photographic film provides standard exposure indexes up to 4000. Very fast film is available in both black and white film and color film. As a result the amount of light in a scene being photographed and particularly under conditions of lower light levels, light from such a scene must be more carefully measured in order that an acceptable photographic rendition may be made. Exposure meters heretofore available and employing a selenium type photovoltaic cell have not been capable of providing a suitable response to such low light levels of illumination in order to accurately control the light impinging upon such a fast highly sensitive photographic film. Likewise such a photovoltaic cell used in combination with light modifying means such as red, green and blue filters is not capable of measuring at such low light levels of illumination the amount of color in terms of color temperature. It will thus be understood that accurate direct measurement of light characteristics over an increasingly greater range of illumination has become a more critical problem in order to provide accurate photographic renditions of a subject being photographed on fast film.

Light characteristics desired to be measured include intensity of illumination and color temperature. Intensity of illumination may be measured both with respect to incident and reflected light, incident light referring to light directly falling upon the subject and reflected light referring to light reflected from the subject. The device of the present invention contemplates employing a translucent light collecting member for measuring incident light and a grid or reticulated member to measure reflected light, if desired, as described in said Patent 2,982,174.

Color quality of light is measured by color temperature and it is understood that color temperature may vary quite widely even though the intensity of light may remain constant. Present color sensitive film has also been increased in speed and is provided for use under preselected light conditions having specified color temperature in degrees Kelvin. Therefore to produce accurate color rendition, measurement of the amount of color or color temperature of light over an extended range of light levels at the time of taking a photograph is necessary. Once color temperature is determined, various methods may be employed to properly select a color filter, or supplement the light source by adding additional selected light, or by modifying the voltage of a particular light source, the latter two methods being employable under controlled inside lighting conditions.

It is desirable to accurately measure the color temperature and color quality of light as by measuring distribution and energy of three spaced wave length bands in the visible spectrum such as red, blue and green. It is desirable that the width of the selected wave length band be carefully selected and that responsive means having high sensitivity in the selected wave length band width be employed. The measurement of energy in such a range for each of the three spaced wave length bands permits measurement of color quality of light not only in a light source emanating light in a continuous light spectrum but also in a light source emanating a light in a discontinuous spectrum band. By comparing the amount of energy in an intermediate wave length band of selected width or range such as green with the amount of energy in the wave length bands of red and blue light, it may be readily accurately determined whether the color quality of light lies within acceptable tolerances of a particular selected color sensitive film.

In the measurement of light characteristics and color quality of light, it is understood that the more quickly, accurately, and directly such light characteristics can be measured, there is greater assurance that the resulting picture rendition will be accurate and a true color rendition made. Thus a direct reading of each of the above characteristics of light is essential and the use of charts and tables to determine light characteristics are to be normally avoided.

The primary object of the present invention is to disclose and provide a combination compact color and exposure photometer capable of measuring the above-identified light characteristics directly, accurately, quickly and over a range of light levels of illumination extending from a fraction of a foot candle.

An object of the invention is to disclose and provide such a combination exposure meter and photometer which is small, compact, capable of being readily held in a hand and operable in a simple direct manner.

An object of the invention is to disclose and provide a novel construction of a combination color and exposure photometer wherein extremely low light levels of illumination may be measured.

Another object of the invention is to disclose and provide a combination three-color photometer and exposure meter wherein means are provided for cooperably associating one of a plurality of photoconductive cells with one of a plurality of light paths so that a selected color characteristic of light may be measured as well as intensity of illumination.

A still further object of the invention is to disclose and provide a novel construction of a combination color and exposure photometer wherein a plurality of light-responsive cells of different type are carried on a cell carrier means and wherein said cell carrier means may be readily moved into operative position with respect to a selected light path for measurement of light intensity and color quality.

More specifically the present invention contemplates a combination three-color and exposure photometer wherein a photovoltaic cell of selenium type, and a plurality of photoconductive cells of metallic crystal type and having high sensitivity in selected wave length bands of light are mounted on a cell carrier member in a particular arrangement whereby one of the photoconductive cells may be used to determine low light levels of illumination as well as the amount of color in a selected wave length band. The cell carrier means is operatively associated with scale means for reading light intensity and color temperature, switch means for selectively energizing the photoconductive cells, a battery power source, and at least two light-admitting ports or light paths whereby movement of the carrier means provides a mode of operation adapted to facilitate rapid measurement of light in terms of intensity and color.

Various other objects and advantages of the present invention will be readily apparent from the following description of the drawings in which an exemplary embodiment of the invention is shown.

In the drawings:

FIG. 1 is a top plan view of a photometer embodying this invention, the top wall of the casing being partially broken away.

FIG. 2 is a sectional view taken in the plane indicated by line II—II of FIG. 1.

FIG. 3 is a fragmentary horizontal sectional view taken in the plane indicated by line III—III of FIG. 2.

FIG. 4 is a fragmentary sectional view taken in the plane indicated by line IV—IV of FIG. 2, the switch means being shown out of normal position for illustration only.

FIG. 5 is a fragmentary sectional view taken in the same plane as FIG. 2 and showing a green photoconductive cell in light receiving-position.

FIG. 6 is a fragmentary sectional view similar to FIG. 5 showing a red photoconductive cell in light-receiving position.

FIG. 7 is a fragmentary sectional view taken in the plane indicated by line VII—VII of FIG. 1.

FIG. 8 is a plan view of a commutator plate carried by the carrier member.

FIG. 9 is a fragmentary perspective view of a carrier member, commutator plate and switching means.

FIG. 10 is a perspective view of a light attenuator means employed with the photometer shown in FIG. 1.

FIG. 11 is a circuit diagram of the photovoltaic and photoconductive cells employed with the photometer of FIG. 1.

A combination color and exposure photometer generally indicated at 10 may comprise a hollow casing 11 of suitable lightweight plastic or metal material capable of being readily molded and shaped. The casing 11 may have a configuration adapted to be readily held in the hand of a user and to facilitate assembly thereof may be formed of two casing portions 12 and 13. The top casing portion 12 may be provided with a generally arcuately shaped wide scale window 14. Adjacent the front of casing 11 may be provided two windows 15 and 16, window 15 being used to observe an indicated position of a scale mask 17 and window 16 being used to indicate the position of a light attenuating plate 18 with its corresponding multiplying factor and also the position of red, green and blue photoconductive cells as later described.

Means to admit light along at least two different light paths may comprise a front light admitting port 20 covered with a light-collecting translucent end member 21 preferably made of plastic material. The translucent collecting member 21 may be transversely elongated with a curved wall section for admitting incident light to port 20. A second light-admitting port 22 may be provided in the side wall of casing portion 13 adjacent the front of the casing. Port 22 may be covered with a transparent glass member 23.

Light-admitting ports 20 and 22 may be provided with masking members 24 and 25 respectively which restrict and mask light admitted through said ports 20 and 22 and also prevent unwanted stray light within the hollow casing from falling upon light-responsive means provided adjacent said ports. The light-masking means may be made of any suitable thin material having non-reflective light characteristics and may be supported from the casing 11 in any suitable manner.

Diaphragm or shutter means 27 for limiting the amount of light passing through port 22 may be provided on the bottom casing portion 13. Diaphragm means 27 may include a pair of longitudinally disposed reciprocally movable shutter blades 28 and 29 each having complementary opposed serrated edges 30 and 31 respectively. Blade 28 may be carried at the front end of a longitudinally extending narrow blade portion 32 which may terminate in a laterally disposed rack portion 33 having rack teeth 34 engaged with a gear 35. Similarly blade 29 has a longitudinally extending portion 36 terminating in a lateral portion 37 provided with rack teeth 38 for engagement with the opposite side of the gear 35. Lateral portions 33 and 37 are provided with elongated slots 39 and 40 which slidably receive spaced pairs of guide pins 41 and 42. The pivot shaft on which gear 35 is mounted may be provided with a top crown gear 43 having engagement with a worm gear 44 carried on a transversely extending shaft 50 suitably rotatably mounted in the side walls of casing portion 13 and extending beyond one side wall for connection with an actuating diaphragm knob 51. When knob 51 is turned it will be readily apparent that the shutter blades 28 and 29 may be moved towards or way from each other to selectively adjust the opening of port 22 so that a selected amount of light may be admitted for purposes later described.

Cell carrier means 54 may be provided at the intersection of the light paths of light admitted through the front port 20 and the side port 22. The cell carrier means 54 may comprise a cell carrier member 55 of polygonal cross-section and in this example presenting four elongated generally rectangular faces for supporting a photovoltaic cell 56 and a plurality of photoconductive cells 57, 58 and 59. As shown in FIG. 4, the cell supporting faces may be recessed in the respective surfaces of the cell member 55, said recesses being provided with outwardly flared faces 61 adapted to cooperate with the masking members 24 and 25. The member 55 may be carried on a shaft 62 having one end extending beyond casing 11 for connection with an actuating knob 63. The opposite end of shaft 62 may be received within a socket 64 provided in a switching member 65 rotatably mounted in the side wall of casing portion 13 and carrying an external actuating knob 66. The cell carrier member 55 may thus be turned relative to the switching member 65 and actuating knob 66.

The particular character and arrangement of the light-responsive means comprising the cells 56, 57, 58 and 59 should be noted. Cell 56 is a photovoltaic cell of selenium type, is self-generating and requires no additional source of energizing power other than the light which impinges upon the surface of the cell. The photovoltaic cell 56 is adapted to match in spectral sensitivity the sensitivity of panchromatic and color films quite well. Cell 56 has sufficient sensitivity to evaluate most daylight illumination and brighter artificial light illumination. Thus photovoltaic cell 56 is adapted for use in making exposure readings through port 20 and especially those exposure readings where the level of light illumination is relatively high, such as 100 foot candles and more.

The photovoltaic cell 56 may be connected through suitable leads (not shown) to a microammeter 68 provided with an indicating needle 69 which extends beneath the scale window 14. FIG. 11 shows an exemplary circuit arrangement for cell 56. The connection between the cell 56 and a section 70 of a commutator means 71 shows a terminal or commutator contact 72 connected with the commutator section 71 to provide a closed circuit when cell 56 is opposite port 20.

The photoconductive cells 57, 58 and 59 each may comprise a photo-resistive metal crystal-type cell which requires a separate battery source for energizing said cell and whereby the impingement of light thereon produces a change in the electrical resistivity of said cell which is a measure of the energy of the wave length bands of light received. Each of the cells 57, 58 and 59 is selectively connected to a battery 74 of mercury type or of a type which provides a relatively constant voltage for substantially the entire life of the battery. The battery 74 may be carried in a battery housing 75 pivotally connected to the side wall of casing portion 13 and carried within said housing 75 in substantially separate sealed relation with respect to the remainder of the casing 11. Such independent sealed mounting of the battery is important to prevent any leakage therefrom from affecting the remaining portion of the photometer. The battery housing 75 may be provided with an extension 76 beyond the pivotal connection at 77 to facilitate swinging the battery housing 75 outwardly from the side wall of the casing. Spring type contact clips (not shown) within the casing not only provide electrical contacts for the battery when it is swung into operative position in casing 11, but also grasp and retain the battery within the casing. The manner of connection of the several cells 57, 58 and 59 to leads to the battery is through the commutating means 71 as described hereinafter, said commutator means 71 including commutator segments P$r$, P$g$, P$b$ and P$v$ connected respectively to the cells 59, 57, 58 and 56.

The photoconductive cell 57 is selected with characteristics of high sensitivity and response to wave length energy in the green region of the visible spectrum. Similarly photoconductive cells 58 and 59 are selected with high sensitivity characteristics to the energy in the wave length bands respectively of blue and red light in the visible spectrum. The width of the wave length bands to which each of these cells 57, 58 and 59 are highly sensitive to may be precisely determined by providing suitable filters over the face of each of such cells which will absorb or block undesired wave length portions. Thus each of the photoconductive cells 57, 58 and 59 will be responsive to a precise width of wave length bands of light energy and at limited selected regions of the visible spectrum.

The photoconductive cells 57, 58 and 59 may have a sensitivity to intensity of illumination one hundred or more times that of the photovoltaic cell 56. Thus since the green cell 57 lies in a mid-range of the visible spectrum the green cell 57 may be used in measurement of very low light levels of illumination and may be used to measure incident and reflected light. For this purpose cell 57 is positioned with respect to the photovaltaic cell 56 for selective disposition at light port 20. Thus the photovoltaic cell 56 and the photoconductive cell 57 may be employed to determine light levels of illumination ranging from a very low level such as one-hundredth of a foot candle to very high levels.

To determine color temperature or color distribution of light the green, blue and red cells 57, 58 and 59 are positionable to receive light admitted through port 22. This is readily accomplished by turning knob 63. Suitable detent means (not shown) may be provided for positively positioning each cell with respect to light port 22 and the position of a cell with respect thereto may be verified by observing through window 16 the letter B, G or R which is placed upon that end of the cell carrier member 55 opposite window 16.

Scale means generally indicated at 80 may be cooperatively associated with the cell carrier means 54 so that when a selected cell is positioned with respect to one of the ports 20 and 22 a scale strip or set of scale indicia is positioned with respect to window 14 for observation. The scale means 80 may comprise a scale plate 81 having longitudinal edge margins slidably received in aligned grooves 82 provided in side walls of the casing 11. The scale plate 81 may be provided with a depending longitudinally extending rib 83 adjacent one longitudinal edge thereof for providing teeth for engagement with a driven sprocket or gear 84 rotatably carried on a stub shaft 85 mounted in the side wall of casing portion 13. Sprocket 85 engages one of a pair of idle gears or sprockets 86 likewise carried on stub shafts 87 mounted in the side wall of the casing portion 13. The other idle sprocket 86 meshes with a drive sprocket or gear 88 fixed to shaft 62 between the side wall of casing portion 13 and the adjacent end of the carrier member 55. Thus as the actuating knob 63 is turned the sprockets 88, 86 and 84 will translate such turning motion to the scale plate 81 and move the same longitudinally of the casing 11 to selectively position scale strips thereon with respect to the scale window 14.

The scale means 80 may comprise a plurality of scale strips arranged thereon in correlation to the arrangement of the cells 56, 57, 58 and 59 on the cell carrier member 55. In this example scale strip 90 is correlated with the green cell 57 and may be marked at the front end of scale plate 81. Scale strip 91 correlated to the photovoltaic cell 56 for regular exposure readings may be positioned adjacent scale strip 90, scale strip 92 is correlated with the position of the blue cell 58, scale strip 93 is correlated with the position of the green photoconductive cell 57 for determining ultra-sensitive exposure readings, and scale strip (reference mark) 94 is correlated to the position of the red photoconductive cell 59. The scale strips may be calibrated in any suitable well known manner and the exposure scales 91 and 93 may be calibrated in terms of foot candles of light or aperture stops. The particular arrangement of the scales 90–94 inclusive is also correlated with the selective positioning of the scale mask 17 which is movable into two positions depending upon whether an exposure measurement or a color temperature measurement is being taken.

The scale mask 17 may comprise a flat thin plate portion 97 having an opening 98 adapted to permit viewing of one scale strip only. The plate 97 may be slidably mounted with its longitudinal edges in longitudinally extending grooves 99 provided in side walls of casing 11 slightly above the grooves 82 of scale plate 81. The scale mask 17 may have an upwardly bent forwardly extending portion 100 provided with a slot adapted to interlockingly receive an upwardly extending pin 101 carried by switch means 65 to move mask opening 98 into a front position or a back position. Portion 100 may have printed thereon the abbreviation "Exp" and in spaced relation thereto the letters "CT" so that when the switch means 65 is positioned for an exposure reading the scale mask will be forwardly positioned so that the letters "Exp" will be visible through window 15. When color temperature readings are taken the switching means 65 is turned so that the letters "CT" will be visible through the window 15 and will cause rearward positioning of the scale mask.

The selective energization of the photoconductive cells 57, 58 and 59 and the manner in which exposure readings and color temperature readings may be taken will now be described in detail. When exposure readings are to be taken actuating knob 66 will be turned so that the "Exp" will appear in the window 15 and the scale mask will be selectively positioned so that only the exposure scales 91 and 93 may be read through a scale mask opening 98. To obtain a regular exposure reading the photovoltaic cell 56 is positioned at port 20 by turning knob 63. Such turning of knob 63 moves scale plate 81 to position scale strip 91 beneath the mask opening 98. Under these conditions terminal 72 is in electrical contact with commutator segment 70 so as to provide a closed circuit between the photovoltaic cell 56 and the microammeter 68.

When reading button 105, which protrudes from the top wall of the casing 11, is pressed downwardly the button may engage a contact 106 on the cell 74. The battery cell 74 however is not energized or operative in the photovoltaic circuit because the terminal or commutator contact 107 is positioned at an opening in the commutator plate 108 so that such circuit would be open. Downward pressing of the button 105 however does release an upwardly biased indicator locking bar 109 so that indicator needle 69 may be free to move in response to the energy of light impinging upon the photovoltaic cell 56. Upon release of the button 105 the locking bar 109 will return to its locked position before de-energization of the circuit and hold indicator needle 69 at the reading so made. Scales 91 may be read without holding the photometer in light-receiving position with respect to the subject upon which the exposure reading is being taken.

To obtain an exposure reading under conditions of very low light levels of illumination (in the order of .01 foot candles) the actuator knob 66 is retained in the above-mentioned position so that the letters "Exp" still appear in the window 19 and the scale mask remains in the above-described position. The cell carrier actuating knob 63 may be turned to position photoconductive green cell 57 at port 20 and scale strip 91 is then moved rearwardly so that scale strip 93 is positioned beneath the scale mask window 98. Since the green photoconductive cell 57 is now positioned at port 20 and cell 57 requires energization by battery 74 to obtain an exposure reading, such turning of the cell carrier member 55 will turn the commutator plate 108 so that commutator terminals 70 and 107 are positioned as shown at E$g$ FIG. 8. Under these conditions when the button 105 is pressed downwardly the indicator needle 69 is unlocked by movement downwardly of the pointer locking bar and the button 105 presses the switch member 106 into contact with a contact button 112 on the battery 74 so that a complete circuit is provided through the green photoconductive cell 57, the battery 74, the terminals 107, 106 and the meter 68. The indicator needle 68 will be positioned with respect to the scale indicia on scale 93 and may indicate in foot candles or aperture stops the light level of illumination of the light being examined. Upon release of the button 105 the locking bar 109 is first secured in reading position and then disengagement of the contact 106 will be accomplished so that the circuit to green cell 57 will be open. Under these conditions it will be apparent from a consideration of FIG. 11 that the photovoltaic cell 56 and its circuit is not operative because the terminal 72 is out of contact with the commutator segment 70 (P$v$). Moreover no light impinges upon the cell 56.

When it is desired to take color temperature readings through the use of the photoconductive cells 57, 58 and 59, each of the cells is selectively positioned with respect to the side port 22. The scale masking port 98 is moved to its second position (rear) by actuation of knob 66 so that the letters "CT" appear in window 15.

When color characteristics of light are measured, in this example, the relative amount of blue and green light may be referenced to a reference amount of the red light. For this purpose the red scale strip 94 may be provided with a reference mark R related to the color characteristics of the color film to be used. The side light-admitting port 22 may then be directed toward the light to be measured and photoconductive red cell 59 may be positioned opposite port 22 by turning knob 63. Such position of the red cell will be verified by the appearance of the letter R in the window 16. With the red cell 59 at port 22, button 105 may be depressed so that the indicator needle 69 will indicate response to the red light impinging upon the red cell. The commutator terminal 107 has been moved into contact with the segment P$r$ of the commutator and the circuit is ready for closing by the button 105. The diaphragm means 27 may then be actuated through diaphragm actuating knob 51 so as to move the shutter blades 28 and 29 toward or away from each other until the indicator 69 is positioned at the reference mark R. Thus the amount of light received by the photoconductive cell 59 for a selected wave-length band of light is limited.

Without changing the position of the shutter blades 28 and 29 as determined above the actuating knob 63 may be turned so as to position the blue photoconductive cell 58 opposite port 22 and to prepare the circuit including the commutator segment P$b$. Such movement of the actuating knob 63 will simultaneously move the scale plate 81 so that the blue scale 92 will be positioned beneath the scale mask window 98. The button 105 may again be depressed to release the indicator needle 69 and to also energize the photoconductive cell 58. The position of the indicator needle 69 from its previously referenced position will indicate the ratio of the blue to the red light. The blue scale may indicate the color temperature of the light and/or may be provided with indicia so calibrated so that the type of plus or minus color temperature correcting filter may be directly read in the event the indicator needle 69 has moved from its reference position. There is thus indicated the necessary type of color temperature correcting filter required to compensate for the difference in color temperature between prevailing illumination and that for which the particular color film being used was designed.

Substantially the same procedure may be followed with respect to the photoconductive cell 57 which determines the ratio of the amount of green light to the amount of red. The diaphragm means is not changed, the green photoconductive cell 57 is positioned opposite port 22, commutator contact 107 is in contact with commutator segment P$g$, and the button 105 is depressed to energize the cell 57 and if there is no change in the position of the indicator needle 69 from the color temperature indicated on the blue scale then no additional green modifying filters or other means for modifying the color characteristics of the film need be employed. If the indicator needle 69 moves to a different color temperature indication on the green scale 90 or to indicia indicating directly the type of additional green correcting filter to be used, color modifying means will be directly indicated. It will be understood of course that upon positioning the green photoconductive cell 57 with respect to the port 22 the scale plate 81 will be moved so that the green scale 90 is positioned beneath the scale mask opening 98.

It will be understood that the reference mark R may be placed on either the green or blue scale and the color characteristics of the light referenced to that particular scale. It will also be understood that by using the color temperature reading derived from both the ratio of blue to red light and of green to red light, accurate determination of the color characteristics of light will be provided. Such results may be readily correlated to the particular means or method employed to modify the light to produce a true color balance within the specified tolerances of the photographic color film being used. The light may be readily correlated to such particular type of color film being used by employing well known compensating filters, modifying the voltage applied to filaments of a light source, or by supplementing the light source with additional light of predetermined spectral characteristics.

While the above description of an exemplary determination of color characteristics of light employs a method using ratios of the amount of light of three separated wave length bands in the visible spectrum it is understood that the scales for the red, blue and green light may be calibrated in different manner so that the amount of blue, green and red light may be separately and individually determined. Also the scales may be so calibrated as to determine color characteristics which utilize only the ratio of the amount of light in the two most widely separated wave length bands such as red and blue. Similarly the scales may be so calibrated as to provide indicia whereby spectral characteristics of a discontinuous spectrum band may be analyzed as described in Letters Patent 2,587,602.

It should be noted that upon positioning of each of the photoconductive cells with respect to the port 22 such positioning simultaneously turns commutator plate 108 so that commutator sections hereof relating to the particular cell being positioned at port 22 and properly correlated with the commutator contacts 72 and 107 so that when the battery circuit is closed by the button 105 only that particular cell in light-receiving position will be energized. Also when the photometer is not in use the button 105 is out of contact with the battery source, the circuits to the photoconductive cells are open, and the battery is inoperative.

Since the photoconductive cells 57, 58 and 59 are of photoconductive or photoresistant type and when energized are highly sensitive to a preselected width of wave length bands of light, color temperature readings may be conducted under conditions of extremely low light levels of illumination down to approximately one-hundredth of a foot candle, for example. Thus color temperature of light at very low light levels of illumination may be determined and may be measured so that proper correction may be made to provide an accurate proper color rendition on a particular type of fast color film being employed.

Since the photoconductive cells 57, 58 and 59 may be many times more sensitive than the photovoltaic cell 56 and since the photovoltaic cell 56 may be too sensitive to read bright sunlight illumination without attenuation the attenuator plate 18 is provided to reduce the sensitivity of the cells. The attenuator plate 18 may comprise a transversely extending elongated curved or concave plate having a plurality of perforations 120 selected as to size and arrangement and adapted to be selectively interposed between the cell carrier member 55 and the ports 20 and 22. The plate 18 may extend from a hub member 121 provided with a circumferential rib 122 which may be received within a complementary groove 123 provided at an opening 124 in the side wall of casing 11 adjacent the actuating knob 63, said hub member 121 being ported at 125 for shaft 62. The hub member 121 may include an external finger engagement portion 126 adjacent knob 63 whereby the plate 18 may be turned into a position opposite port 20 and 22. The surface of plate 18 adjacent hub member 121 may be provided with indicia indicating a multiplying factor. For example when plate 18 is in upper position and is not positioned in front of either port 20 or 22 the factor X1 may appear. When the plate is positioned in front of port 20 the factor X10 may appear. No factor needs to be indicated when the attenuator plate is at port 22. The plate and the shutter means 27 may be used to produce sufficient attenuation to bring the indicator needle to the desired reference position. The attenuator plate 18 may be provided with perforations 120 arranged to provide a multiplying factor of 100 if desired. It will thus be apparent that the color and exposure photometer herein described may be adapted for use in reading extremely high light levels of illumination as well as the extremely low light levels of illumination.

It will be further understood that the photoconductive cell 57 which determines the amount of green light is selected to include a wave length band to best match the broad visibility tri-stimulus Y curve. While it may not match the sensitivity of color film as accurately as a selenium type photovoltaic cell, cell 57 may provide adequate exposure determinations in low light level conditions such as where the eye is not capable of detecting small color differences.

It will be understood that while the cell carrier member 55 provides cell supporting surfaces for four light-responsive cells, the carrier member may be modified to provide surfaces for more or less than four cells. Any such change in the provision of the types of cells carried by the cell carrier member 55 would similarly require a change in the commutator plate 108 in order to provide a desired operation of the photometer.

It will thus be apparent that the exemplary embodiment of the above-described combined three color exposure photometer provides a compact accurate device for determining intensity of illumination of light at very low and high light levels and for adaptation to accurate direct determination of color characteristics of light also at low or very high light levels of illumination.

Various modifications and changes may be made in the above-described embodiment of this invention and all such modifications and all changes coming within the scope of the appended claims are embraced thereby.

I claim:

1. In a combination color and exposure photometer including cooperably associated meter and index and a voltage source, the combination of: a hollow casing provided with two light-admitting ports in spaced relation and arranged to admit light along different paths; diaphragm means carried by the casing to limit light admitted through at least one of said ports; scale means having sets of scale indicia and movably mounted in said casing; a movable cell carrier means arranged in operative relation with respect to both of said light-admitting ports; light responsive means including a photovoltaic cell of relatively low sensitivity to light and a plurality of photoconductive cells of relatively high sensitivity to light on said carrier means; each photoconductive cell being responsive to a different wave length band of light; means connected with said cell carrier means for selectively positioning one of said cells in operative relation with respect to a selected port; each set of scale indicia being related to a cell; and means interconnecting said cell positioning means and said scale means whereby positioning of one of said cells with respect to a selected port automatically positions a set of scale indicia relating thereto.

2. In a photometer as stated in claim 1 wherein said photoconductive cells include a cell having high sensitivity in wave length bands of light for determining the amount of green light and whereby said last mentioned cell may measure intensity of illumination at light levels below those measured by said photovoltaic cell.

3. A photometer as stated in claim 1 wherein said plurality of photoconductive cells include separate cells having high sensitivity in wave length bands of light for determining the amount of red, green and blue light.

4. A photometer as stated in claim 1 including a masking member for said scale means, a switching means operatively connected with a voltage source and with each of said photoconductive cells, and means connecting said masking member with said switching means for selectively covering and uncovering certain of said sets of scale indicia corresponding to photoconductive cells energized by said switching means.

5. A photometer as stated in claim 1 including a mask for said photoconductive cells in cooperable association with one of said light ports.

6. A photometer as stated in claim 1 including switching means operative to energize a photoconductive cell when positioned with respect to one of said light ports and to de-energize said photoconductive cell when moved out of operative position with respect to said light port.

7. In combination a color and exposure photometer including a single carrier means mounted for rotation about an axis; light port means for admitting light along at least two different paths with respect to said carrier means; a photovoltaic cell on said carrier means; a photoconductive cell on said carrier means; said photoconductive cell having high sensitivity in wave length bands of light in the mid-range of the visible spectrum; and means for turning said carrier means to selectively position at least one of said cells with respect to light admitted along at least two paths.

8. A carrier means for use with a color and exposure photometer comprising a carrier member adapted to be mounted for rotation about its longitudinal axis; a photovoltaic cell on said carrier member; a plurality of photoconductive cells on said carrier member, said photoconductive cells providing response to red, green and blue light respectively, said photovoltaic cell being positioned between the photoconductive cells responsive to red and green light, and said photoconductive cell responsive to blue light lying opposite to said photovoltaic cell.

9. In a photometer for measuring intensity of illumination of light over an exceptionally wide range comprising a carrier means mounted for rotational movement; light port means for admitting light along a path with respect to said carrier means; a photovoltaic cell on said carrier means for measuring intensity of illumination of light over higher light levels; a photoconductive cell on said carrier means for measuring intensity of illumination of light at lower light levels; and means for turning said carrier means to selectively position each of said cells with respect to light admitted along said path.

10. A photometer as stated in claim 9 including means for energizing said photoconductive cell, said energizing means being cooperably related to said carrier means whereby said photoconductive cell is energized only when positioned in said light path.

11. In a combination color and exposure photometer including a meter, an index, a battery voltage source and switch means therefor, the combination of: a hollow casing having a window and having at least two light-admitting ports arranged to admit light along different paths; a diaphragm means to limit light admitted through at least one of said ports; a scale means including a plurality of sets of scale indicia operatively positionable with respect to said window; a movable cell carrier member positioned in the light path of each port; light responsive means including a photovoltaic cell of low sensitivity to light on said carrier member operatively connected with said meter and index and positionable with respect to only one of said ports; said light responsive means also including a plurality of photoconductive cells of relatively high sensitivity to light on said carrier member operatively selectively connected with said switch means and said battery source, one of said photoconductive cells being positionable with respect to at least two of said light paths; each set of scale indicia being related to a cell of the light responsive means; each of said photoconductive cells being responsive to a different wave length band of light; means operatively interconnecting said carrier member, said scale means and said switch means whereby turning of said carrier member to position one of said cells with respect to a selected port simultaneously causes a set of scale indicia related thereto to be moved into observable position at said window, and said switch means is selectively actuated or deactuated.

12. In combination with a photometer the provision of: an elongated carrier member mounted for rotation about its longitudinal axis and provided with a plurality of recess means facing outwardly from said axis; a photovoltaic cell in one of said recesses for response to relatively high light levels; a photoconductive cell in one of the other recesses for response to lower light levels; and means for turning the carrier member to operatively position a selected cell in light receiving relation with a light admitting port in said photometer.

13. In a combination as stated in claim 12 the provision of: an energizing means for the photoconductive cell; and means at the end of the carrier member for connecting the photoconductive cell with the energizing means in operative position of the photoconductive cell and for disconnecting the photoconductive cell from the energizing means in non-operative position of the photoconductive cell.

14. In combination with a photometer having a light admitting port, the provision of: an elongated carrier member mounted for rotation about its longitudinal axis adjacent said port, said carrier member having a plurality of cell holding means; a photovoltaic cell retained in one of said holding means; a plurality of photoconductive cells retained in the remainder of said cell holding means; said plurality of photoconductive cells providing response to red, green and blue light, respectively; and means for turning the carrier member to operatively position one of said cells in light receiving relation with respect to said light admitting port.

15. In the combination of claim 14 the provision of: means on said carrier member providing a connection with each photoconductive cell for energizing a selected cell when the selected cell is in operative light receiving relation with respect to said port.

References Cited by the Examiner

UNITED STATES PATENTS

| | | | |
|---|---|---|---|
| 2,203,036 | 6/40 | Van Briessen et al. | 88—23 |
| 2,268,105 | 12/41 | Bing | 88—23 |
| 2,482,174 | 5/61 | Crandell | 88—23 |

JEWELL H. PEDERSEN, *Primary Examiner.*

EMIL G. ANDERSON, *Examiner.*